US008863121B2

(12) United States Patent
Zhao et al.

(10) Patent No.: US 8,863,121 B2
(45) Date of Patent: Oct. 14, 2014

(54) METHOD AND TERMINAL FOR LOADING PICTURE RESOURCES BY JAVA VIRTUAL MACHINE

(75) Inventors: Xiaona Zhao, Shenzhen (CN); Gang Liu, Shenzhen (CN); Dingyong Gou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/380,621

(22) PCT Filed: Nov. 1, 2010

(86) PCT No.: PCT/CN2010/078279
§ 371 (c)(1),
(2), (4) Date: Dec. 23, 2011

(87) PCT Pub. No.: WO2012/024857
PCT Pub. Date: Mar. 1, 2012

(65) Prior Publication Data
US 2013/0160004 A1    Jun. 20, 2013

(30) Foreign Application Priority Data
Aug. 25, 2010 (CN) .......................... 2010 1 0265244

(51) Int. Cl.
*G06F 9/455* (2006.01)
*G06F 3/00* (2006.01)
*H04N 19/00* (2014.01)
*G06T 1/00* (2006.01)

(52) U.S. Cl.
CPC ............... *G06F 9/455* (2013.01); *H04N 19/00* (2013.01); *G06T 1/0007* (2013.01); *G06F 9/45504* (2013.01)
USPC ............................................. 718/1; 715/744

(58) Field of Classification Search
None
See application file for complete search history.

(56) References Cited

U.S. PATENT DOCUMENTS

| 6,647,492 B1 | 11/2003 | Nathan et al. |
| 2007/0085854 A1 | 4/2007 | Zimmer et al. |
| 2009/0129638 A1* | 5/2009 | Kim .............................. 382/118 |
| 2009/0262120 A1 | 10/2009 | Mei |

FOREIGN PATENT DOCUMENTS

| CN | 101719075 A | 6/2010 |
| CN | 101729753 A | 6/2010 |

OTHER PUBLICATIONS

International Search Report for PCT/CN2010/078279 dated May 4, 2011.

* cited by examiner

*Primary Examiner* — Kenneth Tang
(74) *Attorney, Agent, or Firm* — Stephen Yang; Ling Wu; Ling and Yang Intellectual Property

(57) ABSTRACT

The present invention provides a method and a terminal for loading picture resources by a JAVA virtual machine. The method includes: obtaining the picture resources required by the JAVA virtual machine, decoding the picture resources into original data and then storing the original data; and reading the original data of the picture that requires loading to load the picture after receiving a loading picture event in normal operation of the JAVA virtual machine. According to the present invention, the picture loading speed of the JAVA virtual machine can be controlled, thereby guaranteeing the start speed of the JAVA virtual machine.

4 Claims, 2 Drawing Sheets

METHOD AND TERMINAL FOR LOADING PICTURE RESOURCES BY JAVA VIRTUAL MACHINE

TECHNICAL FIELD

The present invention relates to the field of JAVA application, and in particular, to a method and a terminal for loading picture resources by a terminal JAVA virtual machine.

BACKGROUND OF THE RELATED ART

At present, along with the promotion of the international process of mobile phone terminals, continuous expanding of the market size and continuous updating of techniques enable the mobile phone get unprecedented breakthroughs in aspects such as varieties, appearances, and functions, etc., and meanwhile also get expansion and go deep in aspects such as operating systems, chips, and wireless transmission standards, etc. At the same time, a huge demand growth for JAVA is also generated in the mobile phone market. A function supporting the JAVA virtual machine becomes particularly important, and the JAVA virtual machine based on an embedded platform has already become a mandatory requirement for the mobile phone (especially the customized mobile phone) of the most of the mainstream operators. General customers, operators, service/content providers and the mobile phone manufacturers are strongly eager for a more powerful JAVA performance on the mobile phone, supporting more numerous and more complex applications, and producing more business opportunities and incomes for all parties in industrial chain, and meanwhile also bringing more rich and colorful value-added applications to the users.

It is well known that the cross-platform capability of the JAVA virtual machine enables the capability of the mobile phone to be improved continuously. However, how to improve the performance of the JAVA virtual machine at the same time when new services are continuously expanded for the operators and more abundant value-added services are brought to the users is also a problem that requires considering deeply. Loading the picture resources is one of the factors which affect the performance of the JAVA virtual machine. At present, there are two main ways for loading the picture resources by the JAVA virtual machine.

The first way for loading the picture resources is that: firstly the picture resources required by the JAVA virtual machine are performed with a ROM, that is, the picture resources are decoded into the original data (mainly referring to the lattice array of the information, such as the color value and the transparency, etc., that describes each pixel of the picture), and then the original data are integrated into an executable file or a library of the JAVA component when being compiled. When the JAVA virtual machine runs, it directly reads the picture data from the executable file or the jvm library to perform the loading. The advantage of this method is that the process of loading the picture by the JAVA virtual machine is simple, and the original data are directly read from the memory to perform the loading. However, the disadvantage is also more obvious that: on the one hand, the size of the executable file or the library of the JAVA component is increased, which increases the overhead of the mobile phone memory; on the other hand, the JAVA virtual machine version should be re-compiled when a certain picture resource of the JAVA virtual machine changes, in which the picture resources cannot be flexibly configured and the management difficulty of the version in increased in a large scale project customization with a large number of platforms and model machines.

The second way for loading the picture resources is to load the picture resources by using the way of the file system reading the picture resources. That is, when the JAVA virtual machine starts, the picture resources are read from the file system, the required picture resources are decoded to obtain the original data that are not coded and compressed, and then loading is performed. This method increases the time of decoding the pictures in the current condition that there are abundant and a large number of picture resources, which will severely affect the picture loading speed, thereby affecting the user experience.

Now all the existing methods for loading the picture resources by the JAVA virtual machine have their own disadvantages. Especially, the disadvantage of the method for loading the picture resources by the current JAVA virtual machine is particularly obvious in the condition that the capability of the current mobile phone terminal are continuous improved. For example, at present, in order to satisfy the requirement for personalizing graphical interfaces of the user, the mobile phone terminal interface always allows the user to select and switch the interface style. As an important component of the mobile phone terminal, the JAVA virtual machine should correspondingly change its own interface style according to the change of the interface style at the platform side. However, it is difficult to implement this change by using the current existing method for loading the picture resources by the JAVA virtual machine.

In summary, it can be seen that the existing methods for loading the picture resources by the JAVA virtual machine have their own inconveniences and drawbacks in the practical use, so it is necessary to improve.

SUMMARY OF THE INVENTION

Regarding to the above drawbacks, the object of the present invention is to provide a new method and a new terminal for loading the picture resources by the JAVA virtual machine, so as to improve the picture loading speed of the JAVA virtual machine.

In order to solve the above technical problems, the present invention provides a method for loading picture resources by a JAVA virtual machine, which comprises:

obtaining the picture resources required by the JAVA virtual machine, decoding the picture resources into original data, and storing the original data obtained from decoding; and reading the original data of a picture that requires loading to load the picture after receiving a loading picture event in normal operation of the JAVA virtual machine.

The step of decoding the picture resources into the original data can comprise: decoding the picture resources into raw format original data.

The step of storing the original data obtained from the decoding can comprise: storing the original data obtained from the decoding in a file system, wherein the step of storing the original data obtained from the decoding in the file system can comprise: putting original data files of different pictures into the file system under different resource paths according to styles represented by the pictures. The step of reading the original data of the picture that requires loading to load the picture can comprise: converting a current resource path into the resource path where the original data of the picture that requires loading are located, and obtaining the original data file of the picture that requires loading from the file system under the resource path after conversion; and reading the original data from the original data file that is obtained to load the picture.

In order to solve the above technical problems, the present invention provides a terminal, the terminal supports a JAVA virtual machine function, and said terminal comprises:

a pre-processing module, which is configured to: obtain picture resources required by a JAVA virtual machine, decode the picture resources into original data, and then store the original data obtained from decoding; and a loading module, which is configured to: read the original data of a picture that require loading to load the picture after receiving a picture loading event in normal operation of the JAVA virtual machine.

The pre-processing module can be configured to decode the picture resources into raw format original data.

The pre-processing module can be configured to store the original data obtained from the decoding in a file system. The pre-processing module is configured to store the original data obtained from the decoding in the file system in a following way: putting original data files of different pictures into the file system under different resource paths according to styles represented by the pictures. The loading module can be configured to read the original data of the pictures that requires loading to load the picture in a following way: converting a current path into the resource path where the original data of the picture that requires loading are located, and obtaining the original data file of the picture that requires loading from the file system under the resource path after conversion; and reading the original data from the original data file that is obtained to load the picture.

In summary, the method and the terminal for loading the picture resources by the JAVA virtual machine provided by the present invention can control the picture loading speed of the JAVA virtual machine on one hand, thereby guaranteeing the start speed of the JAVA virtual machine; and on the other hand the method and the terminal can configure and use the picture resources flexibly, which enhances the selectivity of the JAVA virtual machine for the loaded picture resources, thereby conveniently solving the problems, such as multi-version management, and interface style switch, etc., in the large scale customization.

PREFERRED EMBODIMENTS OF THE PRESENT INVENTION

In order to achieve the above objects, the present invention mainly isolates picture resources required by a JAVA virtual machine, pre-processes the picture resources and decodes the picture resources into original data of the pictures. When the JAVA virtual machine needs to load the pictures, the required picture resources data are selected flexibly to be loaded dynamically.

In order to understand the present invention more clearly, the present invention is further described in detail with reference to the accompanying drawings and embodiments hereinafter.

Figure 1:
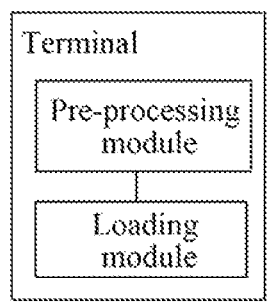
FIG. 1 is a schematic diagram of the terminal according to an embodiment of the present invention.

FIG. 1 is a schematic diagram of the terminal according to an embodiment of the present invention. The terminal in the embodiment supports a JAVA virtual machine function. As shown in FIG. 1, the terminal in the embodiment includes a pre-processing module and a loading module, wherein the pre-processing module is configured to: obtain picture resources required by the JAVA virtual machine, decode the picture resources into original data, and then store the original data;

the loading module is configured to: read the original data of the interface pictures that require loading to load the pictures after receiving the picture loading event during the normal operation of the JAVA virtual machine.

Thus, the terminal of the embodiment isolates the picture resources required by the JAVA virtual machine and pre-processes the picture resources, so the link of decoding the picture resources is reduced when loading the pictures, thereby increasing the picture loading speed.

Further, the pre-processing module is configured to decode the picture resources into the raw format original data.

Preferably, the pre-processing module is configured to put the original data file of the different pictures into the file system under different resource paths according to the styles represented by the pictures.

The loading module is configured to load the pictures in a following way: converting the current resource path into the resource path where the original data of the picture that requires loading are located, and obtaining the original data file of the interface picture that requires loading from the file system under the converted resource path; and reading the original data from the original data file to load the picture.

Thus, the terminal of the embodiment can configure and use the picture resources flexibly, which enhances selectivity of the JAVA virtual machine for the loaded picture resources, thereby conveniently solving the problems, such as multi-version management, and interface style switch, etc., in the large scale customization.

Figure 2:
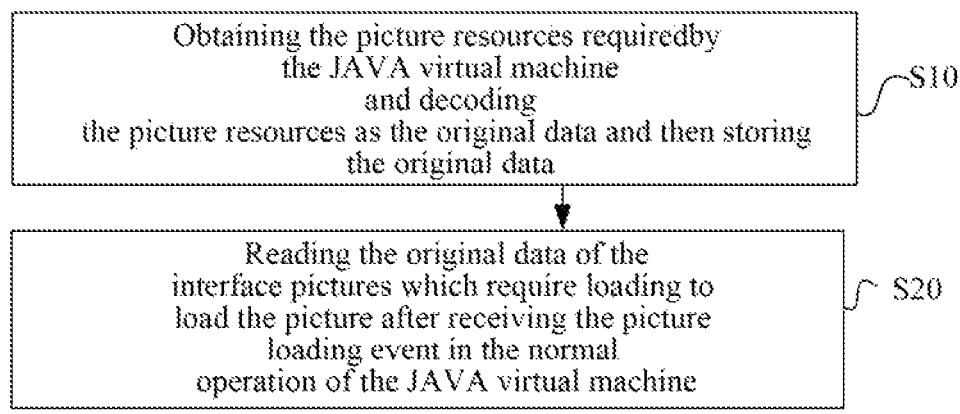
FIG. 2 is a flow chart of the method for loading picture resources by a JAVA virtual machine according to the present invention.

FIG. 2 is a flow chart of a method for loading a picture resource by a JAVA virtual machine according to the present invention. As shown in FIG. 2, the method of the present invention can comprise following steps.

S10, the picture resources required by the JAVA virtual machine are obtained, and the picture resources are decoded into the original data and then the original data are stored;

S20, the original data of the interface picture that requires loading are read to load the picture after receiving the picture loading event (for example the event of changing the interface style or the event of changing the screen size) during the normal operation of the JAVA virtual machine.

Thus, the method of the present invention isolates the picture resources required by the JAVA virtual machine and pre-processes the picture resources, so the link of decoding the picture resources is reduced when loading the pictures, thereby increasing the picture loading speed.

Further, in the step S10, the step of storing the original data comprises putting the original data file of different pictures in the file system under different resource paths according to the styles represented by the pictures.

In the step S20, the step of reading the original data of the interface picture that requires loading to load the picture comprises:

converting the current path into the resource path where the original data of the picture that requires loading are located, and obtaining the original data file of the interface picture that requires loading from the file system under the converted resource path; and reading the original data from the original data file to load the picture.

Thus, the method according to the embodiment can configure and use the picture resources flexibly, which enhances selectivity of the JAVA virtual machine for the loaded picture resources, thereby conveniently solving the problems, such as multi-version management, and interface style switch, etc., in the large scale customization.

Figure 3:
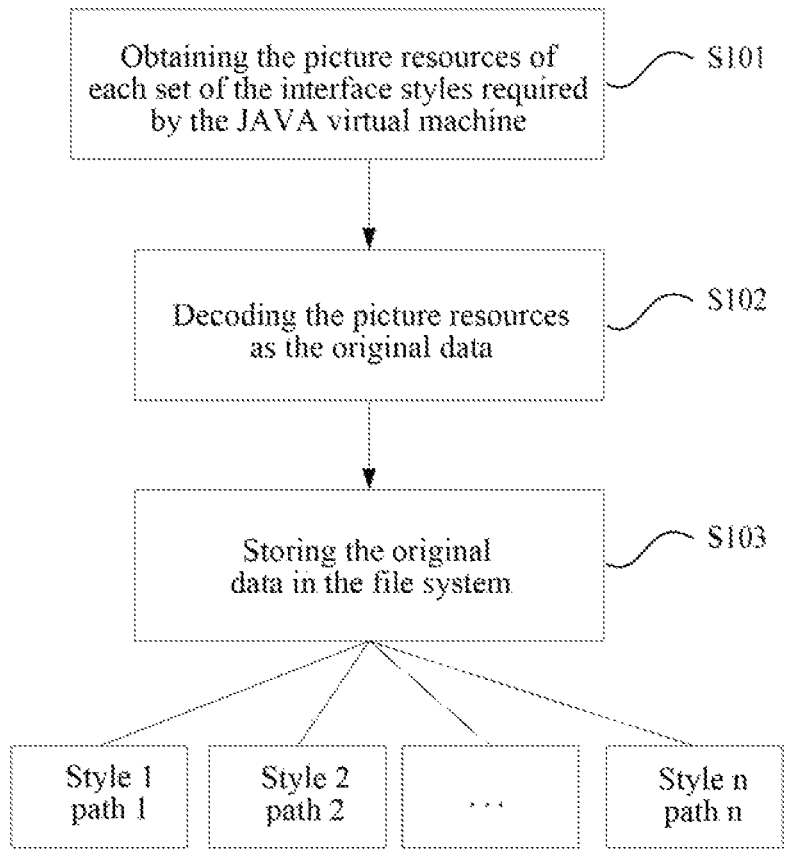
FIG. 3 is a flow chart of pre-processing picture resources according to an embodiment of the present invention.

FIG. 3 is a flow chart of pre-processing picture resources according to an embodiment of the present invention. As shown in FIG. 3, it can comprise the following steps.

S101, the picture resources of various sets of the interface styles required by the JAVA virtual machine are obtained;

S102, the picture resources are decoded into the original data;

specifically, the picture format conversion tools are used to decode the picture resources used by the JAVA virtual machine into the raw format original data.

S103, the original data are stored into the file system.

The generated raw format original data are stored into the file system for subsequent use of loading.

Specifically, the original data file corresponding to each picture is put into the file system under the resource path corresponding to the style represented by the picture according to the different styles represented by the pictures. For example, the picture resources of style 1 are put into path 1, and the picture resources of style n are put into path n.

Figure 4:
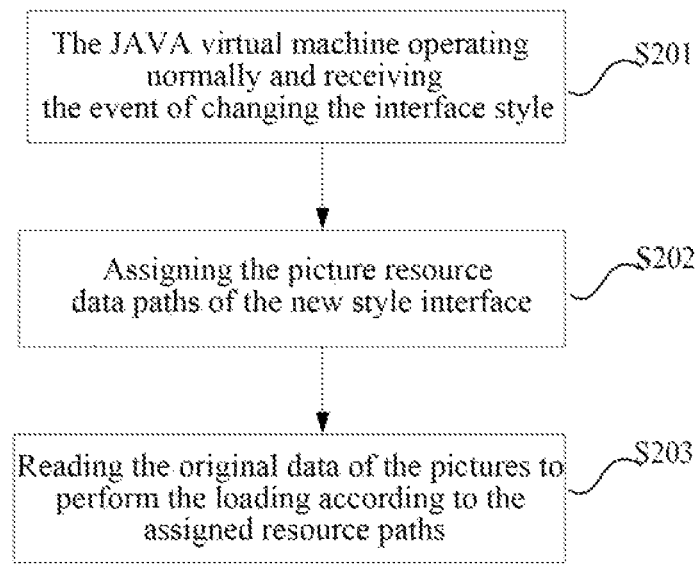
FIG. 4 is a flow chart of loading picture resources by a JAVA virtual machine according to an embodiment of the present invention.

FIG. 4 is a flow chart of loading picture resources by a JAVA virtual machine according to an embodiment of the present invention. As shown in FIG. 4, it can comprise the following steps.

S201, the JAVA virtual machine operates normally and receives the picture loading event that the interface style requires changing;

S202, the resource path is converted, and the picture resource path of the new style interface is assigned;

S203, the original data of the new interface picture are read according to the assigned picture resource path to load the picture.

Specifically, the original data file of the new interface picture is obtained from the file system according to the assigned picture resource path, and the original data of the new interface picture are read to load the picture, which implements the interface style switch of the JAVA virtual machine.

Comparing with the method in which the picture is loaded with a ROM, the method for loading the picture resources by the JAVA virtual machine in the embodiment isolates the picture resources, and keeps the independence of the core version of the JAVA virtual machine. Thus, the picture resources can be configured and used flexibly, and the size of the executable file or the library of the JAVA virtual machine can be controlled. Comparing with the existing method in which the file reads the picture resources, the method in the embodiment pre-processes the picture resources in advance, so the link of decoding the picture resources when loading the pictures is reduced, thereby increasing the picture loading speed.

The above embodiment is only a scenario of loading the pictures using the JAVA virtual machine in the present invention. Certainly the present invention has a plurality of application scenarios. For example, now many mobile phones support the function of switching between the horizontal screen and the vertical screen, and when determining that the current interface screen configuration changes, the JAVA virtual machine requires to load the proper size of picture resource data according to the screen size. According to the method for loading the picture resources of the present invention, the picture resources with various sizes can be loaded correctly and conveniently, and meanwhile, the speed of loading the pictures by the JAVA virtual machine can also be guaranteed.

The method for loading the picture resources provided by the present invention isolates the variable picture resources in the JAVA virtual machine version to be independent and keeps the independence of the core content of the picture resources. Therefore the process of decoding the picture resources is independent rather than being integrated into the executable file or the library of the JAVA virtual machine, so the flexible configuration of the picture resources can be made. Meanwhile, due to the independence of the process of decoding the picture resources, it enables that there is no need to decoding the picture only when the JAVA virtual machine is required to load the pictures, thereby reducing the time of loading pictures of the JAVA virtual machine.

A person having ordinary skill in the art can understand that all or part of the above steps can be done by instructing related hardware with programs, and the programs may be stored in a computer readable storage medium, such as a read only memory, a disk or a laser disk, etc. Optionally, all or part of the steps of the above embodiments also can be implemented by using one or more integrated circuits. Correspondingly, each module or unit of the embodiments may be implemented in the form of hardware, or may be implemented in the form of the software functional module. The present invention is not limited to any specific forms of combinations of the hardware and software.

The above embodiments are only preferred embodiments of the present invention, and certainly the present invention also can have a plurality of other embodiments. All corresponding modifications or transformations that can be made by any person skilled in the art according to the present invention without departing from the spirit and the substance of the present invention shall be within the protection scope of the appended claims of the present invention.

Industrial Applicability

Compared with the related art, on one hand, the present invention can control the picture loading speed of the JAVA virtual machine, thereby guaranteeing the start speed of the JAVA virtual machine; and on the other hand, the present invention can configure and use the picture resources flexibly, which enhances the selectivity of the JAVA virtual machine for the loaded picture resources, thereby conveniently solving the problems, such as multi-version management, and interface style switch, etc., in the large scale customization.

What is claimed is:

1. A method for loading picture resources by a JAVA virtual machine, comprising:

obtaining the picture resources required by the JAVA virtual machine, decoding the picture resources into original data, and storing the original data obtained from decoding in a file system instead of integrating the original data into an executable file or a library of the JAVA virtual machine; wherein the step of storing the original data obtained from the decoding into the file system comprises: putting original data files of different pictures into the file system under different resource paths according to styles of an interface represented by the pictures; and reading the original data of a picture that requires loading to load the picture after receiving a loading picture event in normal operation of the JAVA virtual machine; wherein the step of reading the original data of the picture that requires loading to load the picture comprises: converting a current resource path into the resource path where the original data of the picture that requires loading are located, and obtaining the original data file of the picture that requires loading from the file system under the resource path after conversion; and reading the original data from the original data file that is obtained to load the picture.

2. The method according to claim 1, wherein the step of decoding the picture resources into the original data comprises:

decoding the picture resources into raw format original data.

3. A terminal, characterized in that the terminal supports a JAVA virtual machine function, and said terminal comprises:
a processor
   a pre-processing module, which is configured to: obtain picture resources required by a JAVA virtual machine, decode the picture resources into original data, and then store the original data obtained from decoding in a file system instead of integrating the original data into an executable file or a library of the JAVA virtual machine; wherein the pre-processing module is configured to store the original data obtained from the decoding in the file system in a following way: putting original data files of different pictures into the file system under different resource paths according to styles of an interface represented by the pictures; and a loading module, which is configured to: read the original data of a picture that require loading to load the picture after receiving a picture loading event in normal operation of the JAVA virtual machine; wherein the loading module is configured to read the original data of the pictures that requires loading to load the picture in a following way: converting a current resource path into the resource path where the original data of the picture that requires loading are located, and obtaining the original data file of the picture that requires loading from the file system under the resource path after conversion; and reading the original data from the original data file that is obtained to load the picture.

4. The terminal according to claim 3, wherein
the pre-processing module is configured to decode the picture resources into raw format original data.

* * * * *